United States Patent
Froc et al.

(10) Patent No.: US 12,127,094 B2
(45) Date of Patent: Oct. 22, 2024

(54) INCIDENT REPORTING METHOD AND STRUCTURE

(71) Applicant: ORANGE, Issy les Moulineaux (FR)

(72) Inventors: Erwan Froc, Chatillon (FR); Apostolos Kountouris, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 459 days.

(21) Appl. No.: 17/416,157

(22) PCT Filed: Dec. 13, 2019

(86) PCT No.: PCT/FR2019/053057
§ 371 (c)(1),
(2) Date: Jun. 18, 2021

(87) PCT Pub. No.: WO2020/128252
PCT Pub. Date: Jun. 25, 2020

(65) Prior Publication Data
US 2022/0078597 A1 Mar. 10, 2022

(30) Foreign Application Priority Data

Dec. 21, 2018 (FR) .................................... 1874032

(51) Int. Cl.
*H04W 4/90* (2018.01)
*G06Q 50/00* (2024.01)
(Continued)

(52) U.S. Cl.
CPC .............. *H04W 4/90* (2018.02); *G06Q 50/01* (2013.01); *G06Q 50/265* (2013.01); *H04W 4/025* (2013.01)

(58) Field of Classification Search
CPC ........ H04W 4/90; H04W 4/025; G06Q 50/01; G06Q 50/265; G08B 27/001; G08B 25/006; G08B 25/007; G08B 5/016; G08B 27/008
(Continued)

(56) References Cited

U.S. PATENT DOCUMENTS 9,014,661 B2 * 4/2015 deCharms ............. H04L 65/403
348/14.02
10,045,187 B1 * 8/2018 Soleimani ............... H04W 4/90
(Continued)

OTHER PUBLICATIONS

English translation of the Written Opinion of the International Searching Authority dated Mar. 5, 2020 for corresponding International Application No. PCT/FR2019/053057, filed Dec. 13, 2019.
(Continued)

*Primary Examiner* — Maria El-Zoobi
(74) *Attorney, Agent, or Firm* — David D. Brush; Westman, Champlin and Koehler, P.A.

(57) ABSTRACT

An incident reporting method implemented by a computer. The method includes: generating, at a processing structure, a piece of incident reporting information depending on incident reporting data relative to the incident and generated at one or more user terminals and including at least geolocation data of the incident, selecting one or more recipients of the received incident reporting data depending on the incident reporting data, the recipient or recipients being selected from a database of recipients of the processing structure, and transmitting the incident reporting information to the selected recipient or recipients.

12 Claims, 2 Drawing Sheets

(51) Int. Cl.
    *G06Q 50/26* (2024.01)
    *H04W 4/02* (2018.01)
(58) Field of Classification Search
    USPC .................................................. 455/404.01
    See application file for complete search history.

(56) References Cited

U.S. PATENT DOCUMENTS

| | | | |
|---|---|---|---|
| 11,259,166 B1* | 2/2022 | Lim ...................... | H04W 76/50 |
| 2010/0198649 A1* | 8/2010 | Appleyard ......... | G06Q 10/1097 |
| | | | 715/744 |
| 2010/0246781 A1* | 9/2010 | Bradburn ............. | H04M 3/5116 |
| | | | 379/45 |
| 2014/0365574 A1* | 12/2014 | Franks ................ | H04L 12/1895 |
| | | | 709/204 |

OTHER PUBLICATIONS

International Search Report dated Feb. 27, 2020 for International Application No. PCT/FR2019/053057, filed Dec. 13, 2019.
Written Opinion of the International Searching Authority dated Feb. 27, 2020 for International Application No. PCT/FR2019/053057, filed Dec. 13, 2019.

* cited by examiner

INCIDENT REPORTING METHOD AND STRUCTURE

CROSS-REFERENCE TO RELATED APPLICATIONS

This application is a Section 371 National Stage Application of International Application No. PCT/FR2019/053057, filed Dec. 13, 2019, the content of which is incorporated herein by reference in its entirety, and published as WO 2020/128252 on Jun. 25, 2020, not in English.

FIELD OF THE DISCLOSURE

The field of the invention relates to methods and structures for processing incident report data for the purpose of routing information relating to the reported incident to qualified individuals able to resolve the reported incident.

BACKGROUND OF THE DISCLOSURE

The increase in the number of means of communication and the proliferation of smartphones nowadays allow an extensive network, in which citizens participate, to be set up in any city. Awareness of the dynamism and of the scope of this network has led to the development of "smart cities". This recent concept denotes cities that use information and communication technologies to improve the quality of urban services or reduce their costs.

The smart city contributes more generally to the implementation of "Citizen Sourcing", which relies on the active contribution of citizens to develop new services in which citizens play a leading role. Among the many applications, "Citizen Sourcing" makes it possible for example to collect ideas and suggestions from citizens or even allows improved monitoring of social networks to find collective solutions to problems caused by natural disasters.

Collaborative reporting and recording of incidents is therefore a major challenge for smart cities. Moreover, resolving an incident requires the data relating to the incident in question collected by citizens to be routed to a recipient capable of resolving this type of incident. Specifically, on the scale of a city for example, the various administrations and the various services often have clearly defined fields of intervention and are therefore assigned to resolving certain very specific tasks. The data collection therefore cannot be effective without data processing intended to establish the exact nature of an incident and, therefore, the appropriate recipient of the data relating to the reported incident.

SUMMARY

An exemplary embodiment of the present invention aims to improve the situation.

To this end, what is proposed is a method for processing incident report data, implemented by computing means. The targeted method comprises:

generating, in a processing structure, incident report information on the basis of incident report data relating to the incident, the incident report data being generated at one or more user terminals and comprising at least geolocation data of the incident in question, selecting, on the basis of the incident report information, one or more recipients of the incident report information within a recipient database of the processing structure, and transmitting the incident report information to the one or more selected recipients.

According to one aspect of the invention, at least some of the incident report data are generated via an application executed on the user terminal.

According to another aspect of the invention, the incident report data furthermore comprise data entered by a user of the user terminal via the application.

According to another aspect of the invention, the incident report data comprise data relating to multimedia content generated using the user terminal.

Advantageously, according to another aspect of the invention, the multimedia content is analyzed in the processing structure using object recognition software, data generated by said object recognition software being added to the incident report data.

According to another aspect of the invention, the geolocation data of the incident are determined automatically and correspond to a current position of the user terminal.

According to another aspect of the invention, the processing structure comprises an incident database within which the one or more reported incidents are stored along with the respectively associated incident report data, the received incident report data being analyzed in order to determine, through comparison with the incident report data previously stored in the incident database, whether the incident report data relate to an incident that is already stored in the incident database, such that:

if the received incident report data relate to an incident stored in the incident database, the incident report data in question are associated, within the incident database, with the corresponding incident;

if not, a new incident associated with the received incident report data is stored in the incident database.

According to another aspect of the invention, if at least some of the incident report data are generated via an application executed on the user terminal, a user accesses the application by connecting to a user account that is specific to him/her, and the incident report data comprise an identifier of the user account transmitting the incident report data, this identifier being associated with a confidence index within a user database of the processing structure, and wherein a reliability coefficient is calculated by the processing structure for each reported incident on the basis of the confidence index of the one or more user accounts transmitting the incident report data relating to the incident, the reliability coefficient of an incident being updated upon each reception of incident report data relating to the reported incident.

According to another aspect of the invention, the generation of the incident report information and the selection of the one or more recipients of the incident report information relating to an incident are performed if and only if the reliability coefficient of the incident is greater than or equal to a predetermined threshold.

According to another aspect of the invention, an incident and the incident report data associated with this incident are erased from the incident database if the reliability coefficient of said incident is lower than the predetermined threshold after a predetermined period of time.

According to another aspect of the invention, a completeness coefficient is calculated by the processing structure for each reported incident on the basis of an accuracy criterion relating to the report data relating to said incident, the completeness coefficient being a binary variable that adopts the value 0 when the accuracy criterion is not satisfied and that adopts the value 1 when the accuracy criterion is satisfied, the generation of the incident report information and the selection of the one or more recipients of said incident report information relating to an incident are performed if and only if the completeness coefficient of said incident is equal to 1.

According to another aspect of the invention, the incident report information is made available to the one or more selected recipients via a web portal with personalized content adapted to each recipient.

The recipients may provide feedback with regard to the relevance of the reports made available, in order to fine-tune the process of matching reports and potential recipients. Such feedback may be provided for example via a form in which, for each report made available, a score from 0 to 3 is given by a recipient who has received the report under consideration.

According to one implementation feature of the invention, the one or more recipients are determined automatically via a computing device, such as a learning machine. Such a feature makes it possible to combine the incident selection history with semantic analysis of the profiles of potential recipients.

According to another aspect of the invention, the report information comprises data relating to a type of incident selected from a pre-established list of incident types, each recipient identified in the recipient database being associated with one or more incident types from the pre-established list of incident types.

The invention furthermore relates to a computer program comprising instructions for implementing the method described above when the instructions are implemented by at least one processor.

Finally, the invention targets a processing structure for processing incident report data, designed to generate incident report information on the basis of incident report data relating to this incident, the incident report data being generated by one or more user terminals and comprising at least geolocation data of the incident. Moreover, the processing structure is furthermore designed to select, on the basis of the incident report information, one or more recipients of the incident report information, the processing structure comprising a recipient database from which the one or more recipients are selected. Finally, the processing structure is furthermore designed to transmit the incident report information to the one or more selected recipients.

BRIEF DESCRIPTION OF THE DRAWINGS

Other features, details and advantages of the invention will become apparent from reading the following detailed description, and from analyzing the appended drawings, in which.

DETAILED DESCRIPTION OF ILLUSTRATIVE EMBODIMENTS

Figure 1:
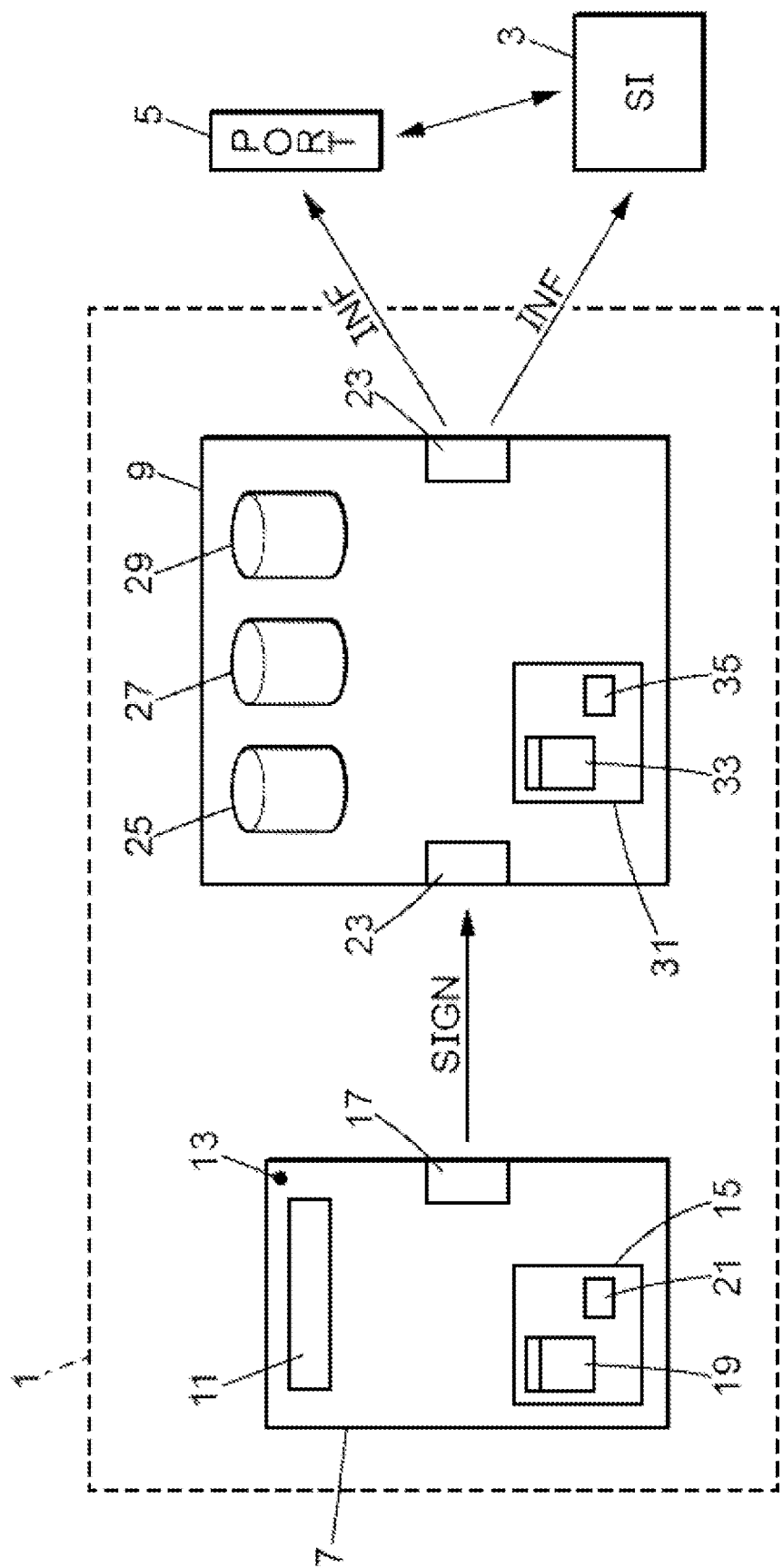
FIG. 1 illustrates a system for processing incident report data according to the invention.

FIG. 1 illustrates a system for processing incident report data, hereinafter system 1, and an information system 3. In the example illustrated, a web portal 5 allows access to information relating to one or more reported incidents.

The system 1 is designed to generate and process incident report data. The system 1 is furthermore designed to route information relating to the reported incidents to one or more recipients, for example the information system 3, so as to facilitate the resolution of the reported incidents by ensuring that the information relating to a given incident is transmitted to the appropriate recipients.

The system 1 comprises one or more user terminals, here a user terminal 7, and a processing structure for processing incident report data, hereinafter processing structure 9.

The user terminal 7 is designed to report an incident to the processing structure 9. More precisely, the user terminal 7 allows a user who possesses it to report an incident by generating and transmitting data for reporting the incident to the processing structure 9. The incident report data comprise at least geolocation data of the incident.

In one or more embodiments, the user terminal 7 is designed to automatically determine the geolocation data of the incident. The geolocation of the incident then corresponds to a current position of the user terminal 7. The current position of the user terminal 7 is for example determined automatically by a server connected to a network to which the user terminal 7 is connected. As an alternative, the user terminal 7 comprises a geolocation module, for example a GPS (acronym for "Global Positioning System") or Galileo module.

In general, an incident is a car accident, a fire, damage to the roadway or any other localized event that may be subject to a report. An incident may also concern a fault with, for example delays experienced by, a public or private transport service provider.

As illustrated in FIG. 1, the user terminal 7 comprises a human/machine interface 11, an image-capturing unit 13, a processing unit 15 and a communication module 17.

The human/machine interface 11 is designed to allow the user in possession of the user terminal 7 to generate data relating to the incident that he/she wishes to report to the processing structure 9.

For example, at least some of the incident report data are generated via an application executed on the user terminal 7. The user may access this application by connecting to a user account. It will be understood here that, in one or more embodiments, a user wishing to participate in the reporting of incidents may do so by executing a client application on the user terminal 7 (for example native or web application executed on a smartphone or a tablet, or web application executed through a Web browser on a personal computer (PC)), and by using a user account that is specific to him/her to connect to a server application. This user account may for example take the form of a data record comprising identification data as well as user authentication data, as the case may be.

Depending on the embodiment, a client application executed on a terminal such as the user terminal 7 may require user registration and the provision of data such as a mobile number, a password or personal data such as his/her home address.

Each user account is associated with an identifier that is specific thereto. Such an identifier makes it possible, as explained below, to determine the user account from which the report data were generated. Another way of looking at things is to consider that, advantageously, the identifier of the user account from which the user reported an incident and provided information about this incident forms part of the generated incident report data.

Using this application, the user may for example enter or provide at least some of the incident report data. In other words, the human/machine interface 11 and the application executed on the user terminal 7 allow the user in possession of the user terminal 7 to generate at least some of the incident report data himself/herself.

For example, the human/machine interface 11 is then designed to allow the user to specify a level of urgency of the incident. For example, the human/machine interface 11 makes it possible to select the level of urgency of the incident on a pre-established scale. The level of urgency is for example characterized by a number or a letter.

Advantageously, the human/machine interface 11 is designed to allow the user to specify a type of incident. For example, the human/machine interface 11 makes it possible to select the type of incident from a pre-established list of potential incidents. This functionality may take the form of a drop-down menu accessible to the user via the human/machine interface 11. As an alternative, the human/machine interface 11 makes it possible to specify an incident type that does not form part of the pre-established list via a free text option accessible to the user.

The level of urgency of the incident or else the type of incident are thus some possible examples of data included in the incident report data generated by the user terminal 7. These data may in particular be entered and provided by the user in possession of the user terminal 7 by executing an application.

Moreover, as explained above, the report data comprise geolocation data of the incident that are determined automatically by the user terminal 7 and correspond to a current position of the user terminal 7. However, as an alternative, the user terminal 7 is designed to allow the user to provide the geolocation of the incident, for example via the application executed on the user terminal 7.

The image-capturing unit 13 is designed to generate multimedia content such as video content or a photograph. In one or more embodiments, the incident report data comprise data relating to multimedia content generated using the user terminal 7, and more precisely therefore using the image-capturing unit 13. For example, a functionality of the application executed on the user terminal 7 allows the user to add multimedia content, and therefore video content and/or one or more photographs, to the entered data.

The processing unit 15 is designed to generate incident report data SIGN.

As explained above, the incident report data SIGN comprise at least geolocation data of the incident.

Moreover, with reference to the embodiments explained above, the incident report data SIGN may furthermore comprise data relating to the level of urgency of the incident and/or data relating to the incident type and/or multimedia content. In general, the incident report data SIGN may comprise any type of data relating to the nature of the incident and that may be useful for resolving said incident.

Advantageously, the incident report data SIGN furthermore comprise an identifier of the user account from which the user of the user terminal 7 reported the incident, via the application executed on the user terminal 7.

As illustrated in FIG. 1, the processing unit 13 comprises a memory 19 and a processor 21. The memory 19 is configured so as to store instructions of a computer program, the execution of which by the processor 21 results in the operation of the processing unit 15 in order to implement the proposed method for processing incident report data, and more specifically generate the incident report data SIGN.

Advantageously, the memory 19 is furthermore configured so as to store an address of the processing structure 9 in order to route the incident report data SIGN to the corresponding processing structure 9. Moreover, the memory 19 may furthermore be configured so as to store an identifier of the user account to which the user of the user terminal 7 usually connects. The identifier of the user account may of course also be extracted therefrom on a one-off basis when a user connects to his/her user account via the user terminal 7. Thus, if a new user uses the user terminal 7 to connect to a user account different from the user account to which the regular user of the user terminal 7 connects, the identifier of this new user account may be extracted, possibly stored in the memory 19, and integrated with the incident report data SIGN.

The communication module 17 is designed to transmit the incident report data SIGN to the processing structure 9. The incident report data SIGN are for example transmitted to the processing structure 9 via a network (not shown in FIG. 1). Such a network is for example a MAN (acronym for "Metropolitan Area Network") network.

Those skilled in the art may realize that there are numerous different types of data communication network, for example radiocommunications networks, which are cellular or not cellular, and that, depending on the embodiment, the communication module 17 may incorporate one or more communication modules, for example radiofrequency communication modules, and be configured so as to transmit and receive radiofrequency signals using one or more technologies, such as TDMA, FDMA, OFDMA, CDMA, or one or more radiocommunications standards, such as GSM, EDGE, CDMA, UMTS, HSPA, LTE, LTE-A, WiFi (IEEE 802.11) and WiMAX (IEEE 802.16), or variants or evolutions thereof, which are currently known or will be developed subsequently.

The processing structure 9 is designed to generate incident report information on the basis of the incident report data SIGN relating to the incident in question. Moreover, the processing structure 9 is furthermore designed to select, on the basis of the incident report information, one or more recipients of the incident report information. In other words, the processing structure 9 is designed to analyze the incident report data SIGN received from the one or more user terminals, such as the user terminal 7, and to apply a processing operation to the incident report data SIGN for the purpose of routing the incident report to the appropriate recipients, in the form of report information, in order to facilitate resolution of the incident.

As illustrated in FIG. 1, the processing structure 9 comprises a communication module 23, an incident database 25, a user database 27, a recipient database 29 and a processing unit 31.

The communication module 23 is designed to receiving incident report data SIGN transmitted by the user terminal 7, and more precisely by the communication module 17 of the user terminal 7. Advantageously, the communication module 23 is designed to receive incident report data SIGN transmitted by multiple user terminals such as the user terminal 7.

The communication module 23 is furthermore designed to communicate with multiple recipients. The communication module 23 communicates for example with the information system 3 via a network (not shown in the figure). In particular, the communication module 23 is designed to transmit the incident report information INF generated by the data processing structure 9 to one or more recipients. Such a network is for example a MAN network.

Moreover, as explained in the remainder of the description, the communication module 23 may furthermore be designed to transmit the incident report information INF to one or more recipients via the web portal 5.

Those skilled in the art may realize that there are numerous different types of data communication network, for example radiocommunications networks, which are cellular or not cellular, and that, depending on the embodiment, the communication module 23 may incorporate one or more communication modules, for example radiofrequency communication modules, and be configured so as to transmit and receive radiofrequency signals using one or more technologies, such as TDMA, FDMA, OFDMA, CDMA, or one or more radiocommunications standards, such as GSM, EDGE, CDMA, UMTS, HSPA, LTE, LTE-A, WiFi (IEEE 802.11) and WiMAX (IEEE 802.16), or variants or evolutions thereof, which are currently known or will be developed subsequently.

The incident database 25 is designed to store the one or more reported incidents along with the incident report data SIGN associated with the reported and stored incidents. It will be understood here that the incident database 25 is configured such that the incident report data SIGN received from user terminals such as the user terminal 7 are grouped together by incident, such that each reported incident is listed in the incident database 25 in association with the incident report data SIGN relating thereto.

It will be understood that the incident database 25 is configured so as to be updated on the basis of the received incident report data SIGN. Moreover, and as expended on in the remainder of the description, an incident and the incident report data SIGN associated therewith may be erased from the incident database 25 under certain conditions, in particular when the received incident report data SIGN relating to an incident are not reliable enough, the reliability being estimated by the processing structure 9 on the basis of a confidence index of each user account reporting the incident. It will be understood that, in this embodiment, each incident listed in the incident database 25 is associated with a reliability coefficient that is able to be updated.

Moreover, advantageously, an incident and the incident report data SIGN associated therewith may be erased from the incident database 25 when the incident is resolved.

Moreover, in one embodiment, a reported incident may be associated with a completeness coefficient characterizing the sufficiency or insufficiency of the provided information relating to the reported incident in question. In other words, such a completeness coefficient makes it possible to characterize whether or not the obtained information relating to a reported incident is sufficient to resolve this incident.

The completeness coefficient is calculated by the processing structure for each reported incident on the basis of an accuracy criterion relating to the report data relating to this incident. For example, the completeness coefficient is a binary variable that adopts the value 0 when the accuracy criterion is not satisfied and that adopts the value 1 when the accuracy criterion is satisfied.

The user database 27 is designed to store the identifier of one or more user accounts such as the user account from which the user of the user terminal 7 reported an incident. Advantageously, the user database 27 is furthermore designed to store a confidence index in association with each of the stored identifiers. It will therefore be understood that, within the user database 27, each identifier of a user account is associated with a confidence index.

The recipient database 29 is designed to store one or more recipients. It will be understood here that the recipient database 29 comprises one or more identifiers, each identifier being associated with a potential recipient of incident report information INF generated by the processing structure 9.

Moreover, the recipient database 29 is furthermore designed to store an address of the recipient under consideration in association with each recipient stored in the recipient database 29. This address subsequently allows the communication module 23 to route the generated incident report information INF to the selected recipients.

In one or more embodiments, the recipient database 29 is designed to store one or more incident types in association with each stored recipient. Typically, the various incident types associated with the recipients within the recipient database 29 form part of the pre-established list of incident types offered to a user wishing to report an incident using his/her user terminal.

Advantageously, each recipient is furthermore associated with a geographical area within the recipient database 29. It will be understood that such a geographical area corresponds to a possible intervention area of the recipient.

The processing unit 31 is designed to generate incident report information INF on the basis of the incident report data SIGN relating to the incident in question.

The incident report information INF comprises data allowing the recipients to have available to them the elements required to resolve the reported incident. For example, the incident report information INF comprises a geolocation of the incident. Still by way of example, the incident report information INF may furthermore comprise the type of reported incident, selected from the pre-established list of incident types.

Moreover, as explained above, the incident report data SIGN may furthermore comprise multimedia content generated by the user terminal 7 using the image-capturing unit 13. The processing unit 31 is then furthermore designed to analyze the transmitted multimedia content using object recognition software. The processing unit 31 then adds the data generated by the object recognition software to the incident report data SIGN.

The processing unit 31 is furthermore designed to select, on the basis of the generated incident report information INF, one or more recipients of the incident report information INF within the recipient database 29 of the processing structure 9.

The selection of the recipients of incident report information INF depends on the type of incident that is reported. As explained above, each recipient stored in the recipient database 29 is associated with one or more incident types. The incident types with which a recipient is associated correspond to the incident types that he/she is able to resolve and that fall within his/her field of intervention. Moreover, the selection of the recipients may furthermore depend on the geolocation of the reported incident.

The processing unit 31 comprises a memory 33 and a processor 35. The memory 33 is configured so as to store instructions of a computer program, the execution of which by the processor 35 results in the operation of the processing unit 31 in order to implement the proposed method for processing incident report data, and more specifically generate the incident report information INF.

In one or more embodiments, the memory 33 is furthermore configured so as to store the pre-established list of incident types.

The information system 3 is designed to receive the incident report information INF generated and transmitted by the processing structure 9. Typically, in the context of the present invention, the information system 3 denotes computing resources for collecting information, here the incident report information INF, from an administration or a service provider, whether this service provider be a public or private body. It will be understood here that the architecture illustrated in FIG. 1 allows this administration or this service provider to gain awareness of an incident reported by one or more users using their user terminals and processed and then routed by the processing structure 9.

For example, the information system 3 belongs to a transport service provider and the incident report information INF makes it possible to report a delay and to provide the elements necessary for dealing with and resolving this delay. Still by way of example, the information system 3 belongs to a fire station and the report information INF makes it possible to report a fire and to provide the elements necessary for dealing with this fire.

Moreover, in one or more embodiments, the incident report information INF may also be made available to the one or more recipients selected by the processing structure 9 via the web portal 5. The web portal 5 presents personalized content adapted to each recipient.

It will be understood here that each information system, such as the information system 3, may access the incident report information by accessing the web portal 5. For example, the administration or the service provider to which the information system 3 is attached may access the web portal 5 by connecting via a user account. Access to this user account may involve the use of an identifier, specific to the information system 3, and of a password. The web portal 5 is then personalized in that the reported incidents may be different from one information system to another.

Such a system may also proactively identify an entity, such as an administration, an association, a public service, etc., and offer it access to reports that may fall within its scope of responsibility. By way of example, reports relating to bus shelters (damage, faults, etc.) in a region under consideration may be offered, by sending an email containing a link to the data associated with the reports, to specialist companies in this region, for example a body that manages public transport, a company that operates advertising space, as well as to the municipal police (especially in cases of vandalism). These recipients of such emails may then consult for example a Web page whose link is contained in the email, and both note the relevance of the reports and retrieve the relevant reports. These new recipients may advantageously fine-tune the selection of incidents that fall within their areas of expertise (categories of relevant reports).

Figure 2:
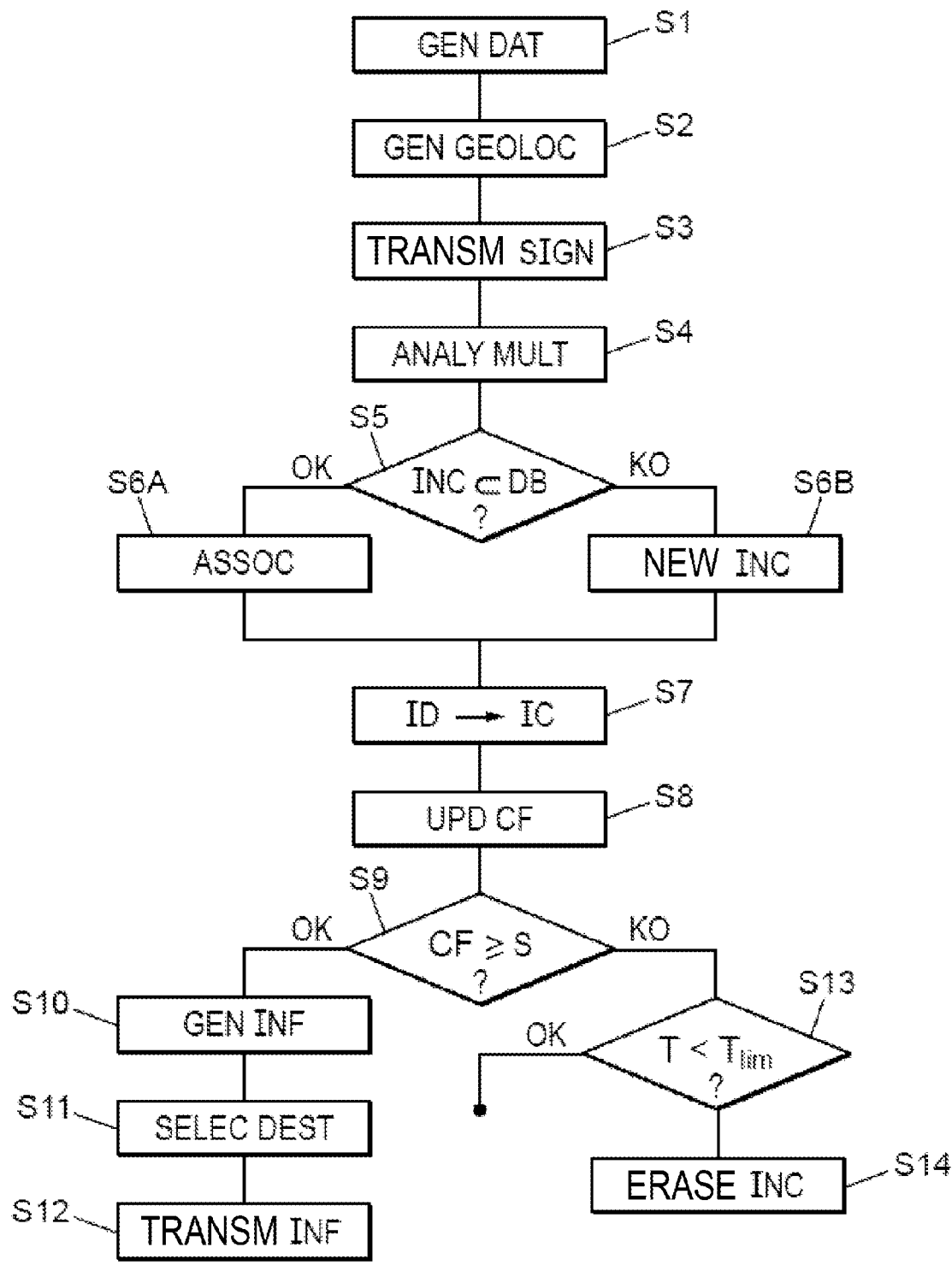
FIG. 2 illustrates a method for processing incident report data according to the invention.

A method for processing incident report data SIG will now be described with reference to FIG. 2.

In the context of the invention, an incident occurs for example in a city. This incident may be a fire, a car accident, damage to the roadway or any other type of incident. Users witnessing this incident want this incident to be resolved as soon as possible, and each have a user terminal such as the user terminal 7.

In a step S1, the user terminal 7 generates incident report data relating to the observed incident. For example, the user in possession of the user terminal 7 executes an application, for example a native application or a web application, allowing him/her to enter and provide data relating to the incident.

Using this application, the user specifies for example the level of urgency of the incident as well as the type of observed incident. As explained above, the user may select the type of incident using a drop-down menu presenting said user with a pre-established list of potential incidents, or use a free text option to describe the incident that he/she wishes to report.

Still in this step, the user may use the image-capturing unit 13 of the user terminal 7 to generate multimedia content relating to the observed incident. This multimedia content corresponds for example to video content or to photographs or to a combination of both. The multimedia content thus obtained then forms part of the incident report data SIGN.

Moreover, as explained above, the user of the user terminal 7 reports the incident for example by executing an application dedicated to reporting an incident and by connecting to a user account specific to him/her. In such a case, therefore, the incident report data SIGN may furthermore comprise an identifier of the user account from which the user of the user terminal 7 reported the incident.

In a step S2, the user terminal 7 automatically generates geolocation data for the incident. These geolocation data correspond to a current position of the user terminal 7. As explained above, the current position of the user terminal 7 is for example determined by a server connected to a network to which the user terminal 7 is connected, or by a geolocation module contained in the user terminal 7.

As an alternative, the geolocation of the incident may be provided by the user himself/herself using the application executed on the user terminal 7.

These incident geolocation data are integrated into the incident report data SIGN.

In a step S3, the communication module 17 of the user terminal 7 transmits the incident report data SIGN to the processing structure 9. The incident report data SIGN are transmitted to the processing structure 9 using the address of the processing structure 9 that is stored in the memory 19 of the processing unit 15 of the user terminal 7. The incident report data SIGN are for example transmitted to the processing structure 9 via a MAN network.

In a step S4, if the incident report data SIGN comprise multimedia content, the processing unit 31 of the processing structure 9 analyzes the multimedia content using object recognition software. Using object recognition software makes it possible to tag the various objects or elements present in the images of the multimedia content, whether this be video content or photographs. Tagging thus makes it possible to automatically determine areas of interest in an image and, through comparison with an object base, stored for example in the memory 33, to generate additional data relating to the reported incident. Such data make it possible for example to improve the accuracy of the geolocation of the incident, to estimate the scale of the incident, its level of urgency or any other information useful for determining the type of incident and for resolving it.

In this step, the data generated by the object recognition software are added to the incident report data SIGN, these thus being enriched.

In a step S5, the processing structure 9 analyzes the received incident report data SIGN, potentially enriched in step S4, using the object recognition software in order to determine, through comparison with the incident report data previously stored in the incident database 25, whether the received incident report data SIGN relate to an incident already stored in the incident database 25.

This comparison may be performed in several ways. First of all, the processing structure 9, and more particularly the processing unit 31, may compare the geolocation data contained in the received incident report data SIGN with the geolocation data contained in the already stored incident report data. It is thus possible to rule out incidents whose geolocation data do not coincide with those of the analyzed incident report data SIGN.

Moreover, after having determined the already stored incidents that are geographically compatible with the new received incident report data SIGN, the processing unit 31 may compare the type of incident with the type of each incident already stored. The comparison may furthermore be based on the data generated by the object recognition software by looking for a correlation between objects detected in the multimedia content of the new incident report data SIGN and objects already detected for the multimedia content of the incident report data already stored in the incident database 25.

In a step S6A, if the received incident report data SIGN relate to an incident already stored in the incident database 25, these incident report data SIGN are associated, within the incident database 25, with the corresponding incident.

As an alternative, in a step S6B, a new incident associated with the received incident report data is stored in the incident database 25.

As explained above, in one or more embodiments, the incident report data SIGN transmitted by the user terminal 7 comprise an identifier of the user account from which the user of the user terminal 7 reported the incident. Moreover, within the user database 27, each user account identifier is associated with a confidence index.

Thus, in a step S7, the processing unit 31 determines the confidence index associated with the identifier of the user account transmitting the incident report data SIGN, that is to say, in the case described here, the identifier associated with the user account to which the user of the user terminal 7 connected and reported the incident from the executed application.

Moreover, as explained above, each incident listed in the incident database 25 is associated with a reliability coefficient. Such a reliability coefficient makes it possible to characterize the reliability of the reported incident and thus to avoid potentially reporting an incident that does not exist.

Thus, in step S8, the processing unit 31 of the processing structure 9 updates the reliability coefficient of the incident to which the received incident report data SIGN relate on the basis of the confidence index associated with the user account transmitting these incident report data SIGN. Of course, if the incident report data SIGN correspond to a new incident, the confidence index makes it possible to initialize the reliability coefficient associated with this new incident. In other words, the processing structure 9 calculates, for each reported incident, a reliability coefficient on the basis of the confidence index of the one or more user accounts transmitting the incident report data relating to the incident under consideration.

In a step S9, the reliability coefficient of the reported incident is compared with a predetermined threshold. This predetermined threshold is for example stored in the memory 33 of the processing unit 31.

Moreover, as an alternative or in parallel, it is also possible to define other conditions that the reported incident should meet in this step S9. For example, in addition to or instead of the condition relating to the reliability coefficient of the incident, the processing structure may determine a completeness coefficient characterizing the sufficiency or insufficiency of the provided information relating to the reported incident. For example, this completeness coefficient is a binary variable that adopts the value 0 when the information provided by the various users, and more precisely the various user accounts, is not sufficient to resolve the reported incident, or the value 1 when the provided information is sufficient to resolve the reported incident.

For example, the completeness coefficient depends on the accuracy of the geolocation of the incident as evaluated by comparing the various geolocation data contained in the incident report data SIGN relating to the incident in question.

Still by way of example, the completeness coefficient may depend on the accuracy regarding the type of reported incident. Specifically, as explained above, the application executed by a user may give said user the option of providing information, via a free text option, about the type of incident, in which case there may be some uncertainty with regard to the type of incident, the qualification of the type of incident possibly varying from one user to another.

In a step S10, implemented if the reliability coefficient of the incident is greater than or equal to the predetermined threshold, the processing unit 31 generates incident report information INF relating to the incident under consideration.

Moreover, as explained above, a completeness coefficient may also be determined by the processing structure 9 such that, in this embodiment, step S10 is implemented only if, in addition to the condition regarding the value of the reliability coefficient, the value of the completeness coefficient is satisfactory.

Thus, if the completeness coefficient is a binary variable, incident report information is generated if and only if the completeness coefficient of the incident is equal to 1.

As explained above, the incident report information INF comprises the elements necessary to resolve the reported incident. The incident report information INF thus comprises the geolocation of the incident as well as the type of incident selected from the pre-established list of potential incidents. Of course, other elements such as the level of urgency of the incident may be contained in the incident report information.

In a step S11, following step S10, the processing structure 9, and more precisely the processing unit 31, selects one or more recipients of the incident report information INF within the recipient database 29 on the basis of the generated incident report information INF.

As explained above, each recipient is associated, within the recipient database 29, with one or more incident types. Thus, for example, the selected recipients are the recipients associated with at least the type of reported incident. Moreover, each recipient may furthermore be associated with a geographical area within the recipient database 29, such that an additional criterion may consist in selecting only the recipients whose geographical area contains the geolocation of the reported incident.

Of course, other embodiments are possible. A recipient may thus be selected by the processing structure 9 even if the geolocation of the incident is not within his/her geographical area if the level of urgency of the incident is low.

In a step S12, the communication module 23 of the processing structure 9 transmits the incident report information SIGN to the one or more selected recipients. Moreover, it should be noted that the address of each recipient is also stored in the recipient database 29, thereby subsequently allowing the incident report information SIGN to be routed. The incident report information INF is for example transmitted to the processing structure 9 via a MAN network.

It is also possible to contemplate mechanisms for automatically determining recipients of interest by using an artificial intelligence technique that, following semantic analysis of the reports and their attributes, would search for potential recipients without them being declared in advance, and thus call on them proactively so that they are able to subscribe as a recipient body or entity. It is also possible, depending on the embodiment chosen, for the information system to be able to probe groups of users in order to exploit the collective intelligence to determine the recipients. The information system may also provide modes for submitting feedback by way of which recipients are able to note the relevance of the reports provided to them by the system; this makes it possible to continuously adjust the selection process. The system may thus randomly offer new types of report in order to discover new associations between report types and corresponding recipients.

As explained above, the incident report information INF may be transmitted directly to the recipient. In the example illustrated in FIG. 1, the recipient of the incident report information INF is the information system 3. The information system 3 is typically the information system of an administration or of a service provider responsible for resolving incidents such as the incident reported via the incident report information SIGN.

Moreover, the incident report information may also be used to update the web portal 5, and more precisely the personalized content of the web portal 5 reserved for the administration or the service provider to which the information system 3 is attached. Thus, by accessing his/her user account, an authorized employee of the administration or of the service provider has access to information relating to a reported incident falling within his/her field of intervention.

Steps S10, S11 and S12 described above are implemented when the reliability coefficient of the reported incident is greater than or equal to the predetermined threshold. However, if the reliability coefficient is lower than the predetermined threshold, the steps described below are implemented by the processing structure 9.

In one or more embodiments, the storage of a new incident in the incident database 25 triggers a predetermined period of time. Thus, if after this predetermined period of time the reliability coefficient of the reported incident is not greater than the predetermined threshold, the incident and the incident report data associated therewith are erased from the incident database 25.

The processing unit 31 is for example provided with a clock (not shown in FIG. 1).

Thus, in a step S13, if the reliability coefficient is less than the predetermined threshold, it is determined whether or not the predetermined period of time associated with the incident has elapsed.

In a step S14, if the predetermined period of time has elapsed, the incident and the incident report data associated therewith are erased from the incident database 25.

On the other hand, if the predetermined period of time has not yet elapsed, the processing structure 9 continues to wait for the reception of new incident report data SIGN that are able to modify the reliability coefficient of the incident.

Those skilled in the art will of course understand here that this constraint linked to the predetermined period of time triggered when the incident is stored in the incident database 25 is applied at all times. The processing structure 9 thus does not wait for the reception of new incident report data SIGN and the calculation of a new reliability coefficient in order to erase the incident if the predetermined period of time associated therewith has expired.

The present invention has multiple advantages.

First of all, the data structure allows efficient processing and routing, thus allowing intelligent reporting of the incident to the recipients affected by the reported incident, thus avoiding calling on a recipient whose field of intervention is separate from the incident.

Next, the possibility of integrating multimedia content into the incident report data and tagging this multimedia content using character recognition software allows more objective data collection than the data entered or provided by a user using the user terminal. Analyzing the multimedia content furthermore makes it possible to collect accurate and useful information for resolving the incident.

Finally, using a web portal with personalized and updated content allows recipients, typically administrations or service providers, to be able to operate in a mode in which they are able to decide when to access incident reports and which ones they wish to resolve as a priority. Although the present disclosure has been described with reference to one or more examples, workers skilled in the art will recognize that changes may be made in form and detail without departing from the scope of the disclosure and/or the appended claims.

The invention claimed is:

1. A method for processing incident report data, implemented by a computing device, the method comprising:
    generating, in a processing structure, incident report information on the basis of incident report data relating to said incident and generated at one or more user terminals and comprising at least geolocation data of said incident, wherein the processing structure comprises an incident database within which the one or more reported incidents are stored along with the respectively associated incident report data, the received incident report data being analyzed in order to determine, through comparison with the incident report data previously stored in the incident database, whether said incident report data relate to an incident that is already stored in the incident database, such that:
        if the received incident report data relate to an incident stored in the incident database, said incident report data are associated, within the incident database, with the corresponding incident;
        if not, a new incident associated with the received incident report data is stored in the incident database,
    wherein at least some of the incident report data are generated via an application executed on the user terminal, and
    wherein a user accesses the application by connecting to a user account that is specific to him/her, wherein the incident report data comprise an identifier of the user account transmitting the incident report data, said identifier being associated with a confidence index within a user database of the processing structure, and wherein a reliability coefficient is calculated by the processing structure for each reported incident on the basis of the confidence index of the one or more user accounts transmitting the incident report data relating to said incident, the reliability coefficient of an incident being updated upon each reception of incident report data relating to said incident,
    selecting, on the basis of said incident report information, one or more recipients of the incident report information within a recipient database of the processing structure, and
    transmitting the incident report information to said one or more selected recipients.

2. The method as claimed in claim 1, wherein the incident report data furthermore comprise data entered by the user of the user terminal via the application.

3. The method as claimed in claim 1, wherein the incident report data comprise data relating to multimedia content generated using the user terminal.

4. The method as claimed in claim 3, wherein the multimedia content is analyzed in the processing structure using object recognition software, data generated by said object recognition software being added to the incident report data.

5. The method as claimed in claim 1, wherein the geolocation data of the incident are determined automatically and correspond to a current position of the user terminal.

6. The method as claimed in claim 1, wherein the generation of the incident report information and the selection of the one or more recipients of said incident report information relating to an incident are performed if and only if the reliability coefficient of said incident is greater than or equal to a predetermined threshold.

7. The method as claimed in claim 6, wherein an incident and the incident report data associated with said incident are erased from the incident database if the reliability coefficient of said incident is lower than the predetermined threshold after a predetermined period of time.

8. The method as claimed in claim 1, wherein a completeness coefficient is calculated by the processing structure for each reported incident on the basis of an accuracy criterion relating to the report data relating to said incident, said completeness coefficient being a binary variable that adopts the value 0 when the accuracy criterion is not satisfied and that adopts the value 1 when the accuracy criterion is satisfied, the generation of the incident report information and the selection of the one or more recipients of said incident report information relating to an incident are performed if and only if the completeness coefficient of said incident is equal to 1.

9. The method as claimed in claim 1, wherein the incident report information is made available to the one or more selected recipients via a web portal with personalized content adapted to each recipient.

10. The method as claimed in claim 1, wherein the report information comprises data relating to a type of incident selected from a pre-established list of incident types, each recipient stored in the recipient database being associated with one or more incident types from said pre-established list of incident types.

11. A non-transitory computer-readable medium comprising instructions stored thereon for processing incident report data when said instructions are implemented by at least one processor, wherein the instructions configure the at least one processor to:
   generate, in a processing structure, incident report information on the basis of incident report data relating to said incident and generated at one or more user terminals and comprising at least geolocation data of said incident, wherein the processing structure comprises an incident database within which the one or more reported incidents are stored along with the respectively associated incident report data, the received incident report data being analyzed in order to determine, through comparison with the incident report data previously stored in the incident database, whether said incident report data relate to an incident that is already stored in the incident database, such that:
      if the received incident report data relate to an incident stored in the incident database, said incident report data are associated, within the incident database, with the corresponding incident;
      if not, a new incident associated with the received incident report data is stored in the incident database,
      wherein at least some of the incident report data are generated via an application executed on the user terminal, and
      wherein a user accesses the application by connecting to a user account that is specific to him/her, wherein the incident report data comprise an identifier of the user account transmitting the incident report data, said identifier being associated with a confidence index within a user database of the processing structure, and wherein a reliability coefficient is calculated by the processing structure for each reported incident on the basis of the confidence index of the one or more user accounts transmitting the incident report data relating to said incident, the reliability coefficient of an incident being updated upon each reception of incident report data relating to said incident,
   select, on the basis of said incident report information, one or more recipients of the incident report information within a recipient database of the processing structure, and
   transmit the incident report information to said one or more selected recipients.

12. A processing structure for processing incident report data, the processing support structure comprising:
   a recipient database; and
   at least one processing unit configured to:
   generate incident report information on the basis of incident report data relating to said incident and generated by one or more user terminals and comprising at least geolocation data of said incident, wherein the processing structure comprises an incident database within which the one or more reported incidents are stored along with the respectively associated incident report data, the received incident report data being analyzed in order to determine, through comparison with the incident report data previously stored in the incident database, whether said incident report data relate to an incident that is already stored in the incident database, such that:
      if the received incident report data relate to an incident stored in the incident database, said incident report data are associated, within the incident database, with the corresponding incident;
      if not, a new incident associated with the received incident report data is stored in the incident database;
      wherein at least some of the incident report data are generated via an application executed on the user terminal, and
      wherein a user accesses the application by connecting to a user account that is specific to him/her, wherein the incident report data comprise an identifier of the user account transmitting the incident report data, said identifier being associated with a confidence index within a user database of the processing structure, and wherein a reliability coefficient is calculated by the processing structure for each reported incident on the basis of the confidence index of the one or more user accounts transmitting the incident report data relating to said incident, the reliability coefficient of an incident being updated upon each reception of incident report data relating to said incident,
   select, from the recipient database and on the basis of said incident report information, one or more recipients of the incident report information; and
   transmit the incident report information to said one or more selected recipients.

* * * * *